Feb. 26, 1963  A. R. PEZZILLO  3,078,805
MOTOR PUMP UNIT
Original Filed Nov. 29, 1956  3 Sheets-Sheet 1

INVENTOR.
Albert R. Pezzillo,
BY
Paul & Paul
ATTORNEYS

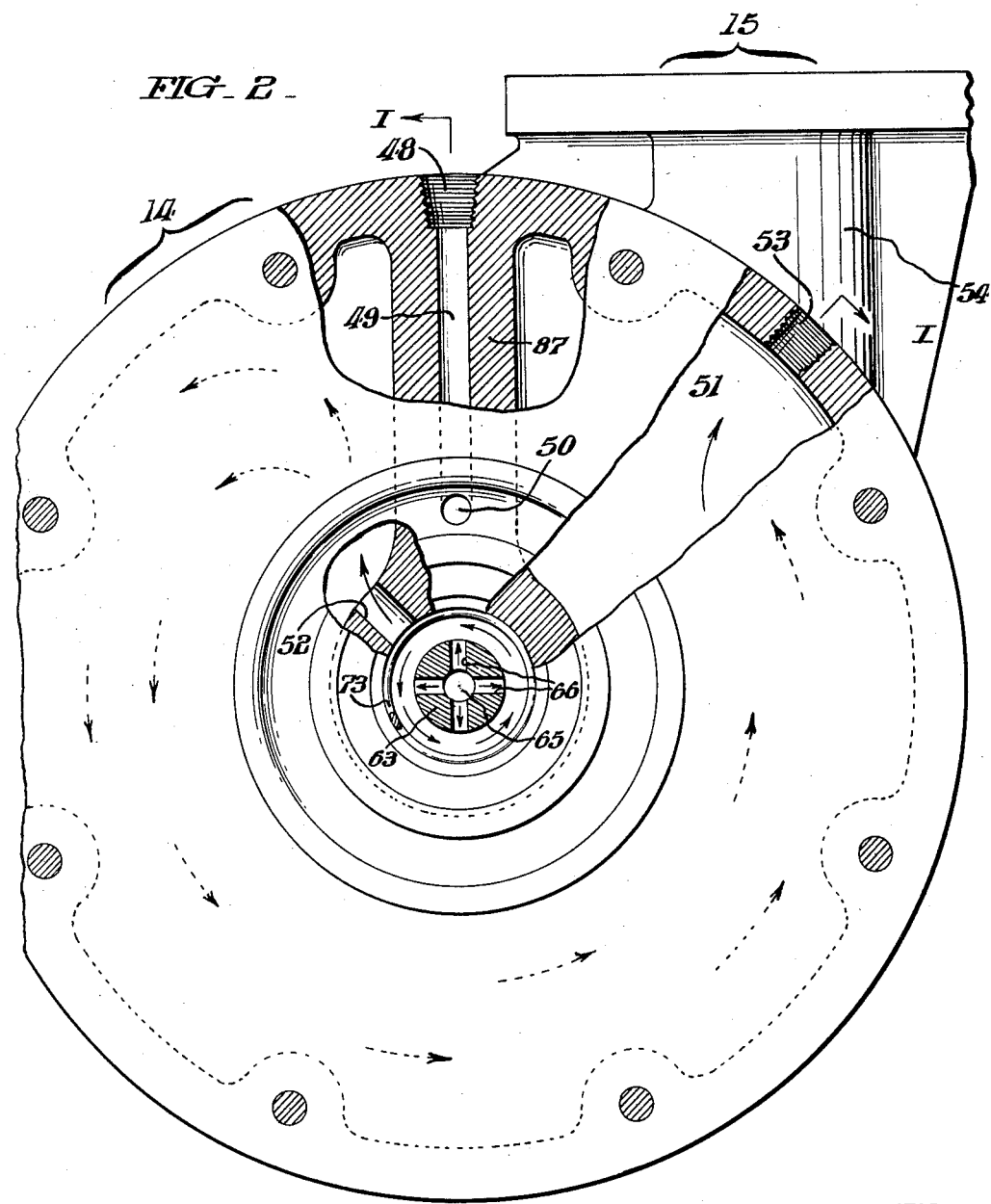

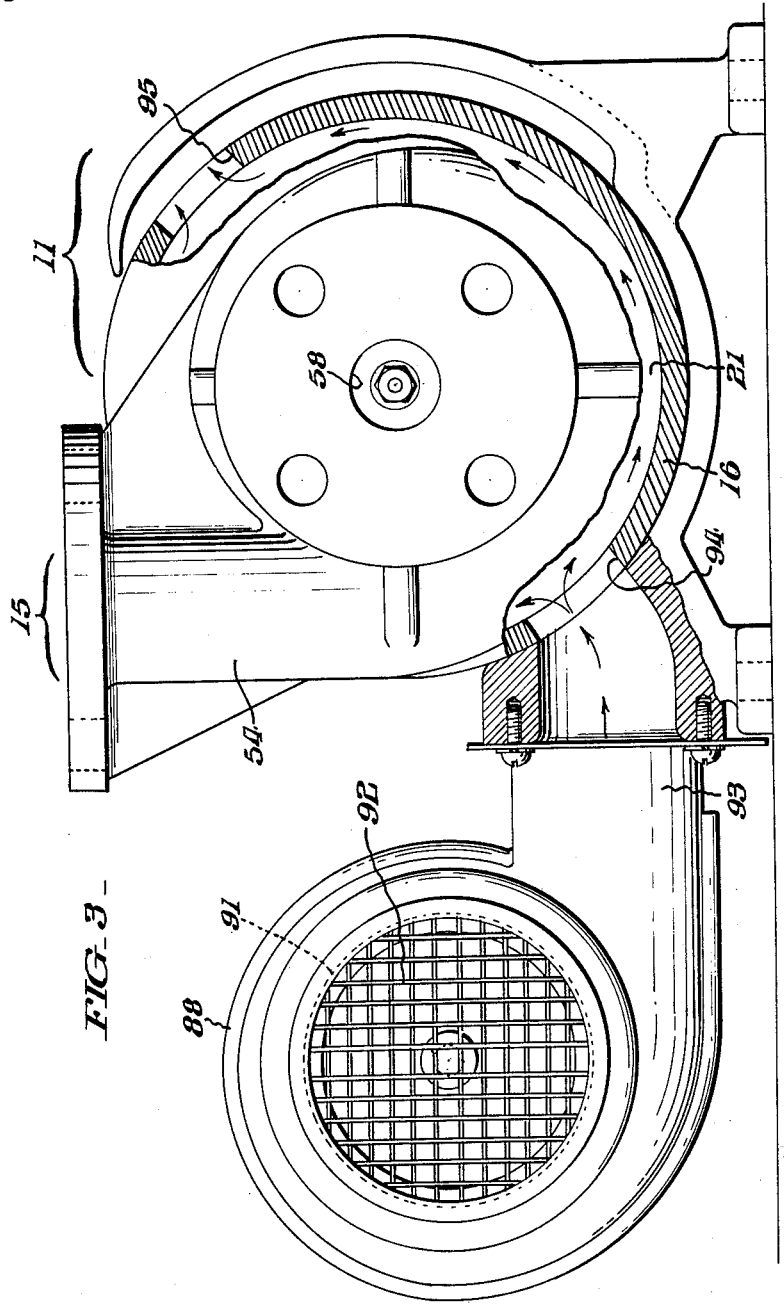

United States Patent Office 3,078,805
Patented Feb. 26, 1963

3,078,805
MOTOR PUMP UNIT
Albert R. Pezzillo, Philadelphia, Pa., assignor, by mesne assignments, to Goulds Pumps, Inc., Seneca Falls, N.Y., a corporation of New York
Continuation of abandoned application Ser. No. 625,011, Nov. 29, 1956. This application July 31, 1959, Ser. No. 843,029
(Filed under Rule 47(b) and 35 U.S.C. 118)
14 Claims. (Cl. 103—87)

This invention relates to a motor pump unit and is a continuation of my application Serial Number 625,011, filed November 29, 1956, now abandoned.

It is an object of this invention to provide a motor pump unit having high efficiency and small friction losses, and which is of simple and compact construction. It is another object of this invention to provide a motor pump unit for pumping abrasive fluids at high temperatures. It is another object to rapidly and efficiently cool the motor section of such a unit, and to inhibit the pumped fluid and the heat thereof from passing to the motor section. Another object is to provide a motor pump unit that is quickly and easily disassembled for cleaning or other maintenance, and is disassembled without the use of special tools.

Other objects and advantages of the invention will further become apparent hereinafter and in the drawings in which:

FIG. 2 represents a cross sectional view of a thermal and slurry barrier comprising a component of the motor pump unit of FIG. 1, with parts broken away to show important details; and FIG. 3 represents an end view of the motor pump with parts broken away to illustrate part of the cooling system.

Figure 1:
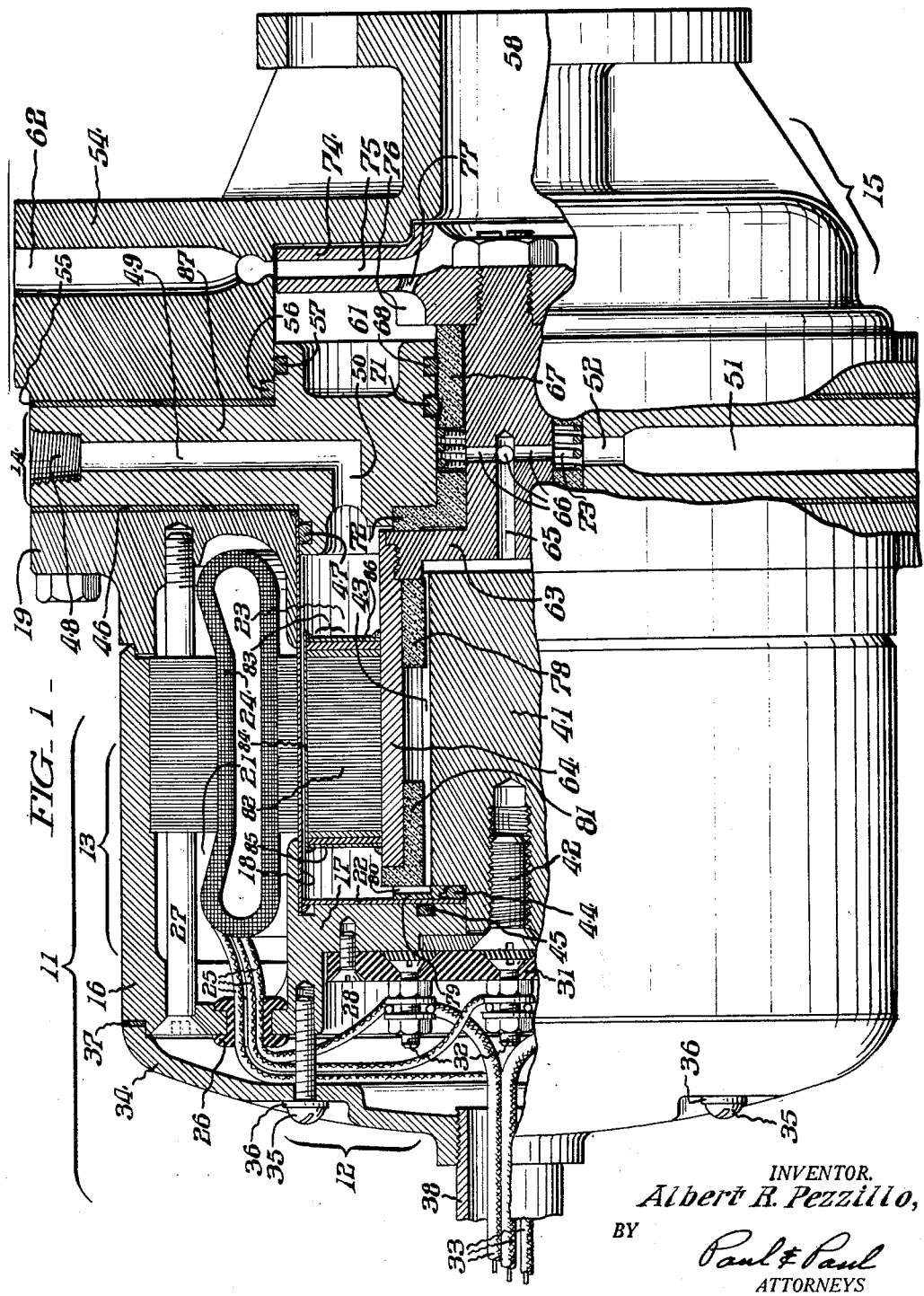
FIG. 1 represents a view in elevation of a motor pump unit constructed in accordance with this invention, with parts broken away in order to illustrate important details and with one portion thereof in section taken as indicated by the lines and arrows I—I which appear in FIG. 2.

Although specific terms are used in the following description for clarity, these terms are intended to refer only to the structure shown in the drawings and are not intended to define or limit the scope of the invention.

Turning now to the specific embodiment of the invention selected for illustration in the drawings, the number 11 designates generally a motor pump unit having an electrical terminal section 12, a motor section 13, a thermal and slurry barrier 14 and a pump section 15. Motor section 13 is provided with a housing 16 having an end portion 17 and an annular end plate 19. Housing 16 has welded thereto a stator sleeve 18, therewith forming a stator chamber 21. Stator sleeve 18 is welded to an end plate 22 which, together with sleeve 18, forms a rotor chamber 23. Enclosed within stator chamber 21 are field coils 24 which are attached to electrical conductors 25 that pass through a fitting 26 in end portion 17 into the electrical terminal section 12. Housing 16 is rigidly connected to annular end plate 19 by bolts 27.

In the electrical terminal section 12, a recess 28 is formed in end portion 17 in which is screwed an electrical terminal block 31. Mounted on terminal block 31 are terminals 32 to which the conductors 25 are connected, and leading from terminals 32 to a source of power (not shown) are conductors 33. Terminal section 12 is provided with a cover 34 which is screwed to end portion 17 by bolts 35. Gaskets 36 are positioned beneath the heads of bolts 35, and a vapor proof gasket 37 is positioned between cover 34 and housing 16. Conductors 33 are passed through an explosion proof coupling 38 located at the center of cover 34 and extend to the source of power. The electrical terminal section 12 is sealed with gaskets 36, 37 and coupling 38 to prevent explosive gases which are sometimes encountered in pumping operations from penetrating into the terminal section and becoming ignited by contacting an electrical spark.

Positioned within rotor chamber 23 is a stub shaft 41 which is mounted upon mounting screw 42. Stub shaft 41 is of cylindrical configuration and has formed in its cylindrical surface three longitudinal grooves 43. Rotor chamber 23 is also provided with O rings 44, 45.

Positioned at the right of annular end plate 19 (FIG. 1) is the thermal and slurry barrier 14 which is provided with a gasket 46 and O ring 47. Barrier 14 includes for passing a cooling liquid an inlet port 48 and a passage 49 which leads to rotor chamber 23 through a port 50. Barrier 14 is also provided with a port 52 which provides for passing the cooling liquid from rotor chamber 23 into a circular passage 51 of barrier 14, and thence to an outlet port 53 (see FIG. 2) located in the perimeter of barrier 14.

To the right of barrier 14 (FIG. 1) is positioned pump section 15 which includes an impeller case 54, separated from barrier 14 by a gasket 55, and which is provided with O rings 56, 57. Impeller case 54 has an inlet passage 58, an impeller chamber 61 and an outlet passage 62 through which fluid is pumped.

A journal shaft 63 having a journal sleeve 64 is positioned within the motor pump unit 11 and has formed therein an axially disposed passage 65 and radial passages 66 which lead from the rotor chamber 23 to barrier 14. A free floating bearing 67 having O rings 68 and 71 is positioned around shaft 63 and is separated from a thrust bearing 72 by a tension spring 73. Bearing 67 can be eliminated when the cooling liquid is circulated at a higher pressure than the pumped fluid, and the cooling liquid is compatible with the pumped liquid. All bearings used in the motor pump unit are preferably made of a graphite composition such as graphitar.

Shaft 63 extends into impeller chamber 61 and has mounted thereon an impeller 74. Impeller 74 is of a centrifugal type and has formed therein radial passages 75 that pass the fluid to be pumped from inlet passage 58 to outlet passage 62. One outside surface of impeller 74 is provided with a plurality of blades 76. Operatively connected to blades 76 are holes 77 in impeller 74 which are connected to the passages 75 of the impeller. Blades 76 agitate the fluid in the impeller chamber 61 and direct the fluid through the holes to prevent the fluid from accumulating and becoming stagnant in the impeller chamber 61. Blades 76 are especially useful in pumping fluid such as latex.

Screwed to journal shaft 63 is the journal sleeve 64 which surrounds stub shaft 41. Sleeve 64 is separated from stub shaft 41 by a bearing 78 and a thrust bearing 81. Thrust bearing 81 contacts a bearing surface of a thrust washer 79 which is provided with three radial grooves 80 that register with grooves 43 of stub shaft 41 in order to pass cooling liquid. Mounted on sleeve 64 is a rotor 82 which is encased in a rotor housing 83 including a circumferential wall 84 and annular end walls 85, 86.

Referring to FIG. 2, passage 51 of barrier 14 is provided with a radially disposed dam 87. Dam 87 has the port 52 positioned adjacent to one wall and has port 53 positioned adjacent the other wall, thereby providing that the cooling liquid pass along almost the entire circumference of passage 51 while within barrier 14.

FIG. 3 illustrates another part of the cooling system, wherein is provided a blower 88 including a motor 91 and an air screen 92. Blower 88 is bolted to housing 16 and passes cooling air through a manifold 93, an inlet port 94, and through the stator chamber 21 around field coils 24 (FIG. 1) to exit through an outlet port 95 in housing 16.

In operation, the motor pump unit 11, the blower 88 and the flow of cooling liquid are all started simultaneously through the use of suitable electric switches and circuitry. Rotor 82 is caused to rotate, thus rotating sleeve 64 and shaft 63 which cause the rotation of the impeller 74. Fluid is drawn through inlet passage 58 of pump section 15 and is passed through impeller 74 to outlet passage 62.

The cooling liquid is passed into thermal and slurry barrier 14 through inlet port 48, then through passage 49 and port 50 into rotor chamber 23 where it cools the rotor and then passes through radial slots 80 to grooves 43 to contact bearings 78, 81, and then to shaft axial passage 65 and radial passages 66 to contact bearings 67, 72, and then outwardly through port 52 into passage 51 to exit through outlet port 53 (see FIG. 2). The cooling system is aided by the thickness and position of the thermal and slurry barrier 14 which inhibits the passage of fluid and the heat thereof between the pump section 15 and the motor section 13. The cooling system is also aided by the blower 88 which blows cooling air around the field coils 24 and through the stator chamber 21.

It has been found that a motor pump unit constructed in accordance with this invention has a high efficiency and small frictional loss, and pumps abrasive fluid of high temperatures efficiently and economically. For example, fluids have been pumped having a temperature of 1000° F., and the temperature within the motor section 13 has been kept below 450° F., the permissible temperature for class H electrical insulation. Another feature is that the unit is easily and quickly disassembled for inspection and cleaning, the unit being so constructed that it requires only a screw driver for disassembling and assembling it.

It is to be understood that the form of the invention herein shown and described is to be taken as a preferred embodiment, and that various changes may be made in the shape, size and arrangement of parts. Further, equivalent elements may be substituted for those described herein. For example, by appropriate substitution for the impeller, the pump can be changed from a centrifugal to a rotary vane or turbine type pump. Additionally, parts may be reversed and certain features of the motor pump unit may be utilized independently of the use of other features, all without departing from the spirit or scope of the invention as defined in the subjoined claims.

I claim:

1. A motor pump unit for pumping fluid, comprising a motor pump housing having a motor section and a pump section, a barrier between said pump section and said motor section, a stator mounted within a stator housing in said motor section, a shaft extending through said barrier and rotatably mounted therein, and having sealing means to seal said shaft relative to said barrier and said pump section, a rotor mounted on one end of said shaft for rotating said shaft, said rotor being sealed within a rotor housing inside of a rotor chamber which in turn is located in said motor section, an impeller mounted on the other end of said shaft in said pump section for pumping a fluid, and means for circulating a cooling fluid under a positive pressure through substantially all of said barrier thereby to inhibit heat transfer between said motor section and said pump section.

2. A motor pump in accordance with claim 1 in which access is provided between said barrier and said rotor chamber whereby said circulating means is effective to circulate said cooling fluid through said rotor chamber for cooling of said rotor.

3. A motor pump in accordance with claim 1 in which said barrier has a first passage through which a cooling fluid is conducted from a source of fluid under pressure to said rotor chamber, a second passage constructed to receive said cooling fluid under pressure from said rotor chamber through which second passage said cooling fluid is circulated and a discharge port through which said cooling fluid is discharged from said second passage.

4. A motor pump in accordance with claim 3 including at least one axially disposed passage in said shaft open to said rotor chamber and at least one radial passage in said shaft providing access from said axially disposed passage to said second passage in said barrier.

5. A motor pump unit for pumping fluid, comprising a motor pump housing having a motor section and a pump section, a barrier between said pump section and said motor section, a stator mounted within a stator housing in said motor section, a shaft extending through, rotatably mounted in and sealed relative to said barrier, a rotor mounted on one end of said shaft for rotating thereof, said rotor being sealed within a rotor housing inside of a rotor chamber which in turn is located in said motor section, an impeller mounted on the other end of said shaft in said pump section for pumping a fluid, a first passage in said barrier through which a cooling fluid is conducted from a source of fluid under pressure to said rotor chamber, a second passage in said barrier having at least one port adapted to receive said cooling fluid and through which said cooling fluid is circulated and at least one discharge port through which said cooling fluid is discharged after being circulated, and passage means for permitting said cooling fluid to flow from said rotor chamber through said shaft to said second passage in said barrier.

6. A motor pump in accordance with claim 5 in which said passage means includes at least one axially disposed passage in said shaft open to said rotor chamber, at least one radial passage in said shaft open at one end to said axially disposed passage in said shaft and extending to the outside circumference of said shaft, and circumferential conduit means registering with both said second passage in said barrier and said radial passages in said shaft, thereby to conduct said cooling fluid from said rotor chamber to said second barrier passage.

7. A motor pump in accordance with claim 6 in which said circumferential conduit means comprises at least two bearing members between said barrier and shaft, said bearing members being spaced to provide a passage extending around the circumference of said shaft, thereby to permit lubrication of said bearing members.

8. A motor pump unit for pumping fluid, comprising a motor pump housing having a motor section and a pump section, a barrier between said pump section and said motor section, a stator mounted within a stator housing in said motor section, a first shaft extending through, rotatably mounted in and sealed relative to said barrier, a rotor mounted on one end of said first shaft for rotating thereof, said rotor being sealed within a rotor housing inside of a rotor chamber which in turn is located in said motor section, an impeller mounted on the other end of said first shaft in said pump section for pumping a fluid, a second shaft mounted in said rotor chamber about which said rotor freely rotates, a first passage in said barrier through which a cooling fluid is conducted from a source of fluid under pressure to said rotor chamber, a second passage in said barrier having at least one port adapted to receive said cooling fluid and through which said cooling fluid is circulated and at least one discharge port through which said cooling fluid is discharged after being circulated, and passage means for permitting said cooling fluid to flow from said rotor chamber between said rotor and second shaft, through said first shaft to said second barrier passage.

9. A motor pump in accordance with claim 8 including bearing means between said second shaft and rotor lubricated by the cooling fluid flowing from said rotor chamber to said first shaft.

10. A motor pump unit for pumping fluid, comprising a motor pump housing having a motor section and a pump section, a barrier between said pump section and said motor section, a stator mounted within a stator housing in said motor section, a shaft extending through and rotatably mounted in said barrier, a rotor mounted on one end of said shaft for rotating thereof, said rotor being sealed within a rotor housing located inside of a rotor chamber which in turn is located in the motor section, an impeller mounted on the other end of said shaft in said pump section for pumping a fluid, a first passage in said barrier communicating with said rotor chamber through which a cooling fluid is conducted from a source of fluid compatible with and under greater pressure than that being pumped by said impeller, a second passage in said barrier constructed to receive said cooling fluid from said rotor chamber, a discharge port in said barrier through which said cooling fluid is discharged from said second passage, and passage means for conducting said cooling fluid from said rotor chamber through said shaft to said second passage, said passage means being exposed to said pump section.

11. A motor pump unit for pumping fluid, comprising a motor pump housing having a motor section and a pump section, a stator having a hermetically sealed stator housing and forming a stator chamber and a rotor chamber which are located within said motor section, a rotor having a hermetically sealed rotor housing and which is positioned within said rotor chamber, said pump section including an impeller chamber formed therein, a rotatable shaft positioned within said rotor and impeller chambers and having said rotor mounted thereon, impeller means mounted on said shaft for pumping fluid, a barrier between said pump section and said motor section sealing the sections against fluid transfer, means circulating a cooling fluid through substantially all of said barrier thereby to inhibit heat transfer between said sections, passage means communicating with said barrier and said rotor chamber conducting said cooling fluid from said barrier to said rotor chamber to circulate the cooling fluid therein externally of said rotor housing.

12. A motor pump as defined in claim 11 including blower means directing cooling air into said stator chamber.

13. The motor pump unit defined in claim 11, wherein said impeller means comprises a cylindrically shaped member having a radial passage formed therein, a radial blade located outside one of the end surfaces of said member, said member having an axial aperture operatively connected between said blade and said passage, whereby said fluid is passed from outside of said member through said aperture into said passage for preventing said fluid from accumulating and becoming stagnant in said impeller chamber.

14. The motor pump unit defined in claim 11, wherein said barrier comprises a member including two radially disposed surfaces joined by an axially disposed perimeter surface, said member having an inlet port located on said perimeter surface and including an inlet passage leading from said inlet port to said rotor chamber, and said member having an outlet port located on said perimeter surface and including an outlet passage leading from said rotor chamber to said outlet port.

References Cited in the file of this patent

UNITED STATES PATENTS

| | | |
|---|---|---|
| 633,732 | Price | Sept. 26, 1899 |
| 2,184,197 | Schutte | Dec. 19, 1939 |
| 2,612,843 | Gruetjen | Oct. 7, 1952 |
| 2,768,584 | Nicol et al. | Oct. 30, 1956 |
| 2,789,238 | Staak | Apr. 16, 1957 |
| 2,885,963 | Ivanoff | May 12, 1959 |
| 2,913,988 | White | Nov. 24, 1959 |
| 2,964,659 | Steele et al. | Dec. 13, 1960 |

FOREIGN PATENTS

| | | |
|---|---|---|
| 200,935 | Australia | Nov. 10, 1955 |
| 1,111,911 | France | Nov. 2, 1955 |